(12) United States Patent
Schmidt et al.

(10) Patent No.: US 8,170,704 B2
(45) Date of Patent: May 1, 2012

(54) METHOD AND SYSTEM FOR AUTOMATIC GENERATION OF THROUGHPUT MODELS FOR SEMICONDUCTOR TOOLS

(75) Inventors: Kilian Schmidt, Dresden (DE); Roy Boerner, Dresden (DE); Jan Lange, Neustadt (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 511 days.

(21) Appl. No.: 12/400,174

(22) Filed: Mar. 9, 2009

(65) Prior Publication Data
US 2009/0248189 A1 Oct. 1, 2009

(30) Foreign Application Priority Data

Mar. 31, 2008 (DE) .......................... 10 2008 016 430
May 16, 2008 (DE) .......................... 10 2008 023 906

(51) Int. Cl.
*G06F 19/00* (2011.01)
(52) U.S. Cl. ...................................... 700/108; 700/111
(58) Field of Classification Search ................. 700/108, 700/111, 112
See application file for complete search history.

(56) References Cited

U.S. PATENT DOCUMENTS

| 5,914,879 A * | 6/1999 | Wang et al. .................... 700/111 |
| 6,873,878 B2 * | 3/2005 | Liu et al. ........................ 700/111 |
| 7,778,798 B2 * | 8/2010 | Ang et al. ...................... 702/182 |
| 2006/0195212 A1 * | 8/2006 | Flach et al. .................... 700/108 |

FOREIGN PATENT DOCUMENTS

| DE | 102006004413 A1 | 8/1997 |
| DE | 102004036300 A1 | 3/2005 |
| DE | 102006004408 A1 | 8/2007 |
| DE | 102005002474 T5 | 9/2007 |

OTHER PUBLICATIONS

Lindemann and Schmid, "Simulationswerkzeuge in Produktion und Logistik," PPS Management 12 (2007).
Translation of Official Communication from German Patent Office for German Patent Application No. 10 2008 023 906.2 dated Feb. 19, 2010.

* cited by examiner

*Primary Examiner* — Ryan Jarrett
(74) *Attorney, Agent, or Firm* — Williams, Morgan & Amerson

(57) ABSTRACT

The throughput of complex cluster tools of a semiconductor manufacturing environment may be determined for a desired manufacturing scenario on the basis of automatically generated throughput models. The throughput models may be established on the basis of rule messages with high statistical relevance.

19 Claims, 7 Drawing Sheets

METHOD AND SYSTEM FOR AUTOMATIC GENERATION OF THROUGHPUT MODELS FOR SEMICONDUCTOR TOOLS

BACKGROUND OF THE INVENTION

1. Field of the Invention

Generally, the present disclosure relates to the field of fabricating microstructures, such as integrated circuits, and, more particularly, to the throughput characteristics of complex process tools, such as cluster tools, used for the fabrication of semiconductor devices or other microstructures.

2. Description of the Related Art

Today's global market forces manufacturers of mass products to offer high quality products at a low price. It is thus important to improve yield and process efficiency to minimize production costs. This holds especially true in the field of microstructure fabrication, for instance for manufacturing semiconductor devices, since, in this field, it is essential to combine cutting-edge technology with volume production techniques. It is, therefore, the goal of manufacturers of semiconductors, or generally of microstructures, to reduce the consumption of raw materials and consumables while at the same time improve process tool utilization. The latter aspect is especially important since, in modern semiconductor facilities, equipment is required which is extremely cost-intensive and represents the dominant part of the total production costs. At the same time, the process tools of the semiconductor facility have to be replaced more frequently compared to most other technical fields due to the rapid development of new products and processes, which may also demand correspondingly adapted process tools.

Integrated circuits are typically manufactured in automated or semi-automated facilities, thereby passing through a large number of process and metrology steps to complete the device. The number and the type of process steps and metrology steps a semiconductor device has to go through depends on the specifics of the semiconductor device to be fabricated. A usual process flow for an integrated circuit may include a plurality of photolithography steps to image a circuit pattern for a specific device layer into a resist layer, which is subsequently patterned to form a resist mask for further processes in structuring the device layer under consideration by, for example, etch or implant processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. As the majority of the process margins are device-specific, many of the metrology processes and the actual manufacturing processes are specifically designed for the device under consideration and require specific parameter settings at the adequate metrology and process tools.

In a semiconductor facility, a plurality of different product types are usually manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, possibly based on different mask sets for the lithography, specific settings in the various process tools, such as deposition tools, etch tools, implantation tools, chemical mechanical polishing (CMP) tools and the like, may be necessary. Consequently, a plurality of different tool parameter settings and product types may be simultaneously encountered in a manufacturing environment.

Hereinafter, the parameter setting for a specific process in a specified process tool or metrology or inspection tool may commonly be referred to as process recipe or simply as recipe. Thus, a large number of different process recipes, even for the same type of process tools, may be required which have to be applied at the process tools at the time the corresponding product types are to be processed in the respective tools. However, the sequence of process recipes performed in process and metrology tools or in functionally combined equipment groups, as well as the recipes themselves, may have to be frequently altered due to fast product changes and the highly variable processes involved. As a consequence, tool performance, especially in terms of throughput, is a very critical manufacturing parameter as it significantly affects the overall production costs of the individual devices. The progression of throughput over time of individual process and metrology tools, or even certain entities thereof, such as process modules, substrate robot handlers, load ports and the like, may, however, remain unobserved due to the complexity of the manufacturing sequences including a large number of product types and a corresponding large number of processes, which in turn are subjected to frequent recipe changes.

Recently, process tools have become more complex in that a process tool may include a plurality of functional modules or entities, referred to as cluster or cluster tool, which may operate in a parallel and/or sequential manner such that products arriving at the cluster tool may be operated therein in a plurality of process paths or tool-internal process flows, depending on the process recipe and the current tool state. The cluster tool may enable the performance of a sequence of correlated processes, thereby enhancing overall efficiency by, for instance, reducing transport activities within the factory and/or increasing tool capacity and availability by using several process chambers in parallel for the same process step. However, due to the plurality of entities involved, the interdependence of process recipes, tool-internal process paths and other parameters, such as the delivery strategy to the tool by the global transport system, the configuration of the interface between the global transport system and tool, i.e., the number of load ports, and the like, is very difficult to assess, for instance, in view of the overall tool performance in terms of tool throughput.

As a consequence, the overall equipment performance, for instance in terms of yield and throughput, is a very critical and complex manufacturing parameter as it significantly affects the overall production costs of the individual devices. The progression of tool yield and throughput over time of individual process and metrology tools or even certain entities thereof, such as process modules, substrate robot handlers, load ports and the like, may remain unobserved due to the complexity of the manufacturing sequences including a large number of product types and a corresponding large number of processes, which in turn are subjected to frequent recipe changes. Hence, low-performing tools may remain undetected for a long time when the performance of an equipment group which the tool under consideration belongs to is within its usual performance margin that typically has to be selected to allow a relatively wide span of variations, owing to the complexity of the processes and the tools involved.

For this reason, it is of great importance for the semiconductor manufacturer to monitor and determine corresponding metrics that provide a measure for the performance of individual process tools, thereby also enabling tool suppliers to specifically improve software and hardware components of process tools on the basis of the data provided by the manufacturers. Since tool requirements may significantly depend on manufacturer-specific conditions, a plurality of industrial standards have been defined to provide a foundation for defining a common global set of semiconductor equipment requirements, thereby reducing company-specific requirements for production equipment while, on the supplier side, attention may be focused on improving process capabilities instead of maintaining many customer-specific products. Thus, in some industrial fields, a plurality of equipment-specific standards have been defined relating to the definition of equipment messages, which for the semiconductor industry are known under SECS (SEMI (Semiconductor Equipment and Materials Institute) Equipment Communications Standard), which establish a common language for a communication between process tools and a remote host system. Similarly, a plurality of standards are established for defining the tool performance. For example, in the field of semiconductors, the E10 and E58 standards provide a basis to assess the reliability, availability and the maintainability (RAM) of process tools using standard tool states. Other standards, such as the E116 standard, have been introduced to describe the performance of process tools based on a state model, wherein the tool state is automatically reported by providing state transitions and run rate information.

Consequently, in a complex manufacturing environment, a large amount of information related to the process tool may be available with a varying degree of resolution, depending on the overall configuration of a control system of the manufacturing environment under consideration. That is, the respective state models for representing the individual process tools in the manufacturing environment may allow monitoring and controlling of the process tools at a higher abstract level, for instance by a supervising MES (Manufacturing Execution System) while, at a lower level, even information with respect to the operational state of individual entities of the various process tools may be available in the form of respective tool messages. In this respect, a functional entity of a process tool is to be understood as any unit that may hold a work piece, such as a substrate for forming semiconductor devices such as a process chamber, a robot handler and the like. Hence, although a large amount of valuable tool-specific information may be available in the manufacturing environment, an estimation and monitoring or controlling of throughput-related aspects of the process tools may be difficult, since usually process lines may suffer from unobserved throughput losses caused by, for instance, process and set-up changes and/or equipment malfunctions and the like. That is, due to the complexity of modern semiconductor facilities, a certain degree of variability of the manufacturing process average throughput rates calculated from lot processing times or from state output data may not efficiently allow detection of tool performance of individual tools or tool groups with respect to throughput. For example, in many process tools, a plurality of functional entities may be process chambers for performing a respective process on the basis of a dedicated process recipe. In many process tools, two or more equivalent process chambers may be provided so as to allow a certain degree of parallelism when processing the substrates according to the specified recipe. Similarly, a plurality of different process steps may be integrated into a single tool, which may also be referred to as cluster tool, so that a plurality of process steps may be performed on the basis of different process recipes, while other functional entities may be responsible for providing the required substrate handling resources, such as load ports, robot handlers and the like. Thus, the throughput of a complex process tool may significantly depend on the basic configuration in terms of substrate handling resources and actual process models, in combination with the specific process recipes to be applied in the various process modules.

For example, upon reduced functionality or even complete failure of one of a plurality of parallel or equivalent process modules, the process tool may still be operable, but may have a reduced throughput, which may possibly remain undetected on the basis of determining throughput of equipment groups, for instance, on a monthly basis, as is frequently practiced in semiconductor facilities. However, even if tool messages may be monitored to detect the current operational status of the process tool under consideration, an estimation of the throughput may be obtained on the basis of number of lots or substrates up to a specific point in time and the corresponding time interval required for processing the substrates or lots. Thus, only a "retrospective" estimation of the throughput may be obtained, while the "current" throughput may be difficult to estimate, in particular when the operational status of the process tool under consideration may have changed. That is, throughput may be dependent on the current status of the process tool and the respective process recipe to be applied in the various functional entities, so that conventional approaches relying on the number of substrates processed over the past time interval and the length of the time interval may not allow a predictive estimation of the throughput nor may these approaches enable an estimation of the throughput behavior for one or more process tools in view of different operational scenarios so as to estimate the throughput upon certain events, such as a variation of process recipes, reconfiguring the operational status of the process tool and the like.

For this purpose, throughput models have been proposed in order to provide a certain degree of "look aside" functionality with respect to the throughput of complex cluster tools. A throughput model is to be understood as a mathematical method or model to determine the throughput of specific process tools when operating on the basis of specified process recipes while also taking into consideration a number of conditions or parameters. The throughput is represented by the number of processed work pieces divided by the time interval necessary for processing these work pieces. In these models, it is further assumed that, before and after this time interval, the process tool is empty, that is, the respective entities of the process tools, such as robot handlers, process chambers and the like, do not contain any work pieces. The amount of work pieces processed within the time interval under consideration is also frequently called a cascade, wherein the individual elements of a cascade may represent individual work pieces, such as substrates for semiconductor devices, or groups of substrates, when the processing of the work pieces in the functional entities of the process tool may be performed on a group of substrates at a time. In this case, respective process tools may also be referred to as batch tools.

At the beginning of a cascade, i.e., when supplying the first work piece to the process tool, a certain time elapses before the first work piece is completely processed. This time, i.e., the time required for the first work piece to pass through all process steps to be performed for the specified work piece, may be referred to as first piece time, and this time interval is typically longer than the respective time intervals at which subsequent work pieces will leave the last process step in the process tool. Thus, in a respective throughput model, throughput may be determined by the length of a cascade divided by the entire process time, which may include the first piece time, i.e., the process time for the very first work piece of the cascade, and the intervals of the remaining work pieces of the cascade. Thus, in a throughput model, the conditions and parameters defining the first piece time and the time intervals of the subsequent pieces may have to be distinguished and quantified. This may be accomplished by two different approaches. For the first piece time, the actual process flow in the process tool under consideration may be determined, i.e., the actual sequence of processes to be performed in the individual process chambers on the basis of respective process recipes. On the other hand, for the time intervals of the subsequent work pieces, the tool resources are at the focus of interest. In this case, it may typically be necessary to consider all resources in order to determine a limiting or bottle-neck resource of the process tool, which may determine the time intervals for the subsequent work pieces.

Thus, determining predictive throughput models may require a certain degree of intuition and a high level of experience of the process engineer by extracting respective very limited information from a restricted amount of tool messages and by appropriately defining the material flows in the process tool under consideration. Hence, the conventional approach for generating a throughput model may be a time-consuming task, the result of which may depend on highly subjective criteria, which may result in inconsistencies when applying throughput models that are established by different process engineers. Additionally, the necessary time consumption for the model generation leads to long time intervals between updates to the throughput model, thereby leading to the usage of potentially outdated models.

The present disclosure is directed to various methods and systems that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to systems and methods for estimating the throughput of process tools in a manufacturing environment, which, in some illustrative embodiments, may represent a manufacturing environment for fabricating microstructure devices, by using tool messages on an entity level to obtain statistically relevant tool-specific data, which may be used for estimating the throughput of the process tool for a specified operational scenario. Based on the tool messages of higher resolution, i.e., based on tool messages representing tool events created by each involved functional entity of a process tool under consideration, respective material flows in the process tool and the associated process time intervals may be extracted in an automatic fashion on the basis of high statistic relevance, thereby imparting a high degree of robustness to the corresponding throughput estimations obtained. In some illustrative aspects disclosed herein, throughput models may be automatically generated by determining the functional entities, such as robot handlers, process chambers and the like, on the basis of tool messages obtained with high coverage of the respective process tools, i.e., the tool messages as obtained from the equipment interface, thereby providing enhanced resolution, compared to, for instance, a representation of the respective process tools in a supervising control system such as an MES, as is typically provided in complex semiconductor facilities, in which many entities may actually not be "instantiated" in the corresponding state models representing the tools. Furthermore, the material flows through the cluster tool or cluster of tools under consideration may be determined at a level of the functional entities, wherein it may be automatically distinguished between functional entities that are not associated with a process recipe and functional entities, such as process chambers, which are associated with a process recipe. Consequently, in some illustrative approaches, average process time intervals may be determined for the recipe-related entities, which may be accomplished on the basis of appropriately averaging time intervals determined from tool events, while for functional entities not related to process recipes, statistically relevant process time intervals may also be determined. From these time intervals of high statistical significance and on the basis of the previously-determined material flows, an appropriate throughput model may be automatically established with a high degree of objectivity, which may then be used for the estimation of throughput values with respect to preselected operating scenarios or for estimating the current throughput status of the tools in the manufacturing environment.

One illustrative system disclosed herein relates to a throughput model generator. The throughput model generator comprises a data input section configured to receive tool-specific information about configuration and operational status of a process tool used in a manufacturing environment. The throughput model generator further comprises a data base operatively connected to the data input section and configured to store a data model of the process tool, wherein the data model represents at least a material flow in the process tool. The generator further comprises a model calculator operatively connected to the data base and configured to determine a throughput of the process tool on the basis of the data model and one or more throughput-related parameters. Furthermore, the throughput model generator comprises a user-interface operatively connected to the model calculator and configured to select a value of the one or more throughput related parameters.

One illustrative method disclosed herein relates to automatically determining a throughput of a process tool. The method comprises identifying functional entities of the process tool by monitoring tool messages that are created by the process tool during operation. The method further comprises identifying one or more material flows as a sequence of process steps performed by at least some of the functional entities. Furthermore, a process time interval of each of the process steps of the one or more material flows is determined. Additionally, the method comprises determining a throughput of the process tool for a selected process scenario for the one or more material flows by using the determined process time intervals.

A further illustrative method disclosed herein comprises automatically monitoring tool messages created by a process tool during operation in a manufacturing environment, at least over a specified operating period, wherein the tool messages contain tool events created by a plurality of functional entities of the process tool. The method additionally comprises statistically evaluating the tool events for each of the plurality of functional entities of the process tool to obtain a representative process time interval for each of the functional entities, wherein the representative process time intervals correspond to a specified material flow in the process tool. Furthermore, the method comprises determining a throughput of the process tools for the specified material flow on the basis of the representative process time intervals.

BRIEF DESCRIPTION OF THE DRAWINGS

The disclosure may be understood by reference to the following description taken in conjunction with the accompanying drawings, in which like reference numerals identify like elements, and in which:

FIG. 1b schematically illustrates a time diagram for processing a plurality of substrates, also referred to as a cascade, in the cluster tool of FIG. 1a;

FIG. 1c schematically illustrates a diagram of a material flow through the cluster tool of FIG. 1a;

Figure 1A:
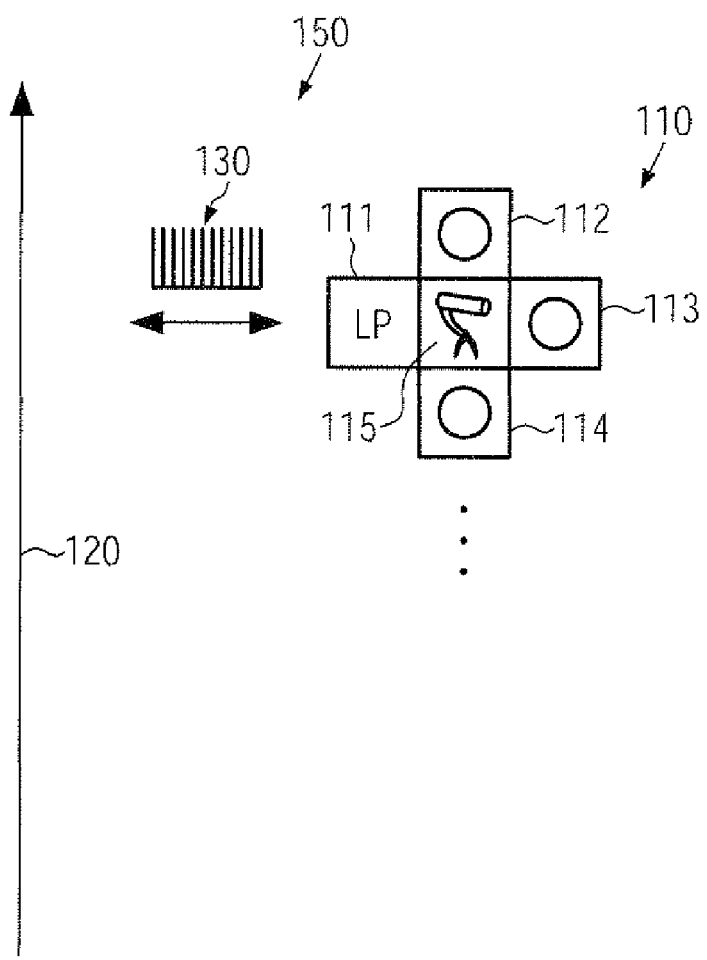
FIG. 1a schematically illustrates a manufacturing environment comprising an illustrative cluster tool, the throughput of which is to be estimated on the basis of an automatically generated throughput model.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure relates to systems and methods for estimating the throughput of one or more process tools in a manufacturing environment on the basis of a throughput model, which may be established in an automatic manner by using an appropriate amount of tool-specific information created by the process tools during operation so as to obtain statistically relevant process time intervals for individual process steps performed in the process tools under consideration. Furthermore, efficient algorithms may be implemented to automatically identify the functional entities of a process tool and respective material flows using at least some of the identified functional entities. Consequently, the operational status of a process tool under consideration may be determined automatically on entity level, while the material flows therein may also be identified so as to enable the determination of recipe-dependent process steps and recipe-independent process steps for the tool under consideration. Consequently, recipe-specific characteristics of a specified operating scenario may be taken into consideration in an automatic manner, while the tool-dependent resources may also be represented by the functional entities not depending on a specific recipe so as to allow determination of resource-depending process time intervals. In this manner, the influence of recipe changes, indications of the tool configuration, for instance in view of adding additional resources, shutting-off of entities due to maintenance and the like, may be estimated with enhanced accuracy and robustness with respect to process fluctuations, due to the statistically-determined process time intervals. Moreover, compared to conventional approaches, the generation of respective throughput models may be performed with a high degree of consistency, since respective criteria for determining throughput-specific parameters may be applied in the same manner to a plurality of process tools, while also providing the potential for varying the criteria so as to obtain different "views" with respect to the creation of throughput models. For example, the statistical data handling may be changed, for instance by privileged users, in order to identify a dependency of the throughput results on data manipulation processes and/or to adapt or "calibrate" the estimated throughput results to actual measurement data and the like for enhancing the accuracy of throughput estimations for the current situation in the manufacturing environment. For instance, the process time intervals for static functional entities, that is entities that are not dependent on specific process recipes, may be varied to enhance agreement with actually measured throughput values and/or estimating throughput enhancement while reconfiguring respective functional entities, for instance by enhancing transport capability and the like. Thus, due to the automatically generated throughput models, which are based on statistically relevant data, a plurality of operating scenarios may be studied, wherein respective results may be used for configuring and/or controlling at least a portion of the manufacturing environment under consideration. For example, maintenance of functional entities of process tools may be coordinated so as to result in a minimized throughput loss by appropriately scheduling the overall material flow in the manufacturing environment on the basis of the throughput estimations. That is, upon studying the throughput dependence of a plurality of process tools for a plurality of product types, recipes and the like, a process scenario may be identified that may suffer from a minimum throughput loss during maintenance of one or more of the functional entities. Similarly, upon occurrence of a malfunction of a functional entity, the effect on the overall throughput of a portion of the manufacturing environment may be determined with reduced or substantially no delay and, if required, an appropriate rescheduling of the overall material flow in the manufacturing environment may be initiated to maintain the overall throughput at a high level.

Furthermore, in some illustrative aspects disclosed herein, the throughput model generator may be based on historical data, which may enable the identification of operational states of process tools, which may possibly not be detectible by the currently available tool messages, thereby significantly enhancing the responsiveness of the throughput models with respect to changes of the tool status. For example, process tool messages gathered over a certain operating period may indicate a specific operational status of the process tool, for instance, a functional entity may be shut down due to maintenance and the like, which may therefore not be reflected in the presently-used throughput model of the process tool. When the functional entity is operational again, the change of the status of the tool may be recognized and an appropriate material flow, now also including the re-connected functional entity, may be retrieved from the historical data in combination with the respective historical process time intervals. Consequently, upon occurrence of a reconfiguration of the process tool under consideration, the throughput model may be adapted correspondingly and hence throughput for the current or any other assumed process scenario may be determined with high accuracy.

Thus, according to the principles disclosed herein, the physical conditions, i.e., the number and arrangement of functional entities, the type of work pieces to be processed, such as single substrates, groups of substrates and the like, the process time intervals defined by process recipes, i.e., the duration of actual process steps, the process time intervals defined by mechanical requirements, such as robot movement times, different pin movement times for receiving a wafer in a process chamber and the like, and the flow of substrates through the process tool, i.e., the steps and their relation to the functional entities performing the steps, may be performed in an automated manner on the basis of appropriate control sequences and statistically relevant tool-specific data. Thus, other throughput-related parameters for defining various operating scenarios may be entered into the systems and methods in accordance with process requirements and the like. For instance, the length of a specific cascade, the lot size and the like may be used as throughput-related parameters. Hence, throughput values may be estimated with high precision on the basis of robust statistical data, thereby enabling a determination of throughput characteristics during a desired operating period and for any process scenario.

FIG. 1$a$ schematically illustrates a manufacturing environment 150, which, in one illustrative embodiment, represents a facility for fabricating microstructure devices, such as advanced semiconductor devices and the like. The environment 150 may comprise one or more process tools 110, which may be configured to perform a sequence of process steps required for processing work pieces, which may represent single work pieces or a group of work pieces, depending on the overall configuration of the tool 110. In the following, it may be referred to substrates as work pieces, which may represent wafers and the like that are appropriately configured so as to form therein and thereon microstructure devices. It should be appreciated, however, that the principles disclosed herein may be applied to any type of complex products requiring a plurality of process steps. It should be appreciated, therefore, that the present disclosure should not be considered as being restricted to microstructure devices and respective substrates, unless such restrictions are specifically set forth in the appended claims.

The manufacturing environment 150 may further comprise a transport system 120, which may be provided in the form of an automatic system in which vehicles may transport work pieces or substrates 130 from one process tool to another, depending on the overall schedule in the environment 150. Furthermore, the transport system 120 may comprise appropriate interface systems for exchanging the substrates 130, which may also be contained in appropriate containers, with the one or more process tools 110. For this purpose, the one or more process tools 110 may comprise one or more load ports 111 configured to receive the substrate 130 from the transport system 120 and also to enable removal of substrates having been processed in the tool 110. Furthermore, in the example shown, the process tool 110 may represent a cluster tool, i.e., a process tool comprising a plurality of process chambers 112, 113, 114, some of which may be provided to perform the same process, while other process chambers may be dedicated for different processes. For example, if a plurality of etch steps with different etch chemistries may have to be performed, at least some of the process chambers 112, 113 and 114 may provide a respective sequence of different etch steps, each of which may be performed on the basis of a different process recipe. In other cases, parallel and sequential operation of the tool 110 may be provided, for instance when two or more process chambers may perform substantially the same process, while at least one other process chamber may perform a different process. As an illustrative example, it may be assumed that the process tool 110 may perform a sequence of process steps, in which a substrate passes through the chamber 112 and passes subsequently through one of the chambers 113 or 114, since these process chambers may be operated on the basis of the same process recipe.

Moreover, the process tool 110 may further comprise a tool-internal transport system 115, for instance in the form of a robot-handling system, which may be configured to supply substrates to and remove them from respective entities 111, 112, 113 and 114. It should be appreciated that, in the context of the present disclosure, the process chambers 112, 113, 114, the load port 111 and the tool-internal transport system 115 may be referred to as functional entities which may represent a basic unit capable of holding a substrate. Furthermore, the functional entities 111, 112, 113, 114, 115 may be operated under the control of a tool-internal control system (not shown), wherein respective activities of the entities 111, 112, 113, 114, 115, which are also indicated as tool events, may be communicated to the tool-internal control system in response to respective commands issued by the control system. Thus, respective tool messages indicating the activity of the individual functional entities 111, 112, 113, 114, 115 may be accessible by an external device via a respective equipment interface, which will be described later on in more detail.

In operation, the process tool 110 may receive a cascade of substrates 130, i.e., respective substrates may be delivered to the tool 110, i.e., to the one or more load ports 111, by the transport system 120 such that a predefined number of substrates 130 may be continuously processed in the tool 110. For this purpose, one or more containers including a respective number of substrates 130 may be delivered to the load port 111, or respective substrates 130 or respective groups thereof may be sequentially supplied to the load port 111 such that a continuous supply to the process chamber 112, which may represent the actual first process of the material flow in the tool 110, may be guaranteed. Thus, the capacity of the load port(s) 111, for instance the number of individual load port stations and the like, may be adapted to the transport capability of the system 120 so as to establish a cascading mode of operation of the tool 110.

Figure 1B:
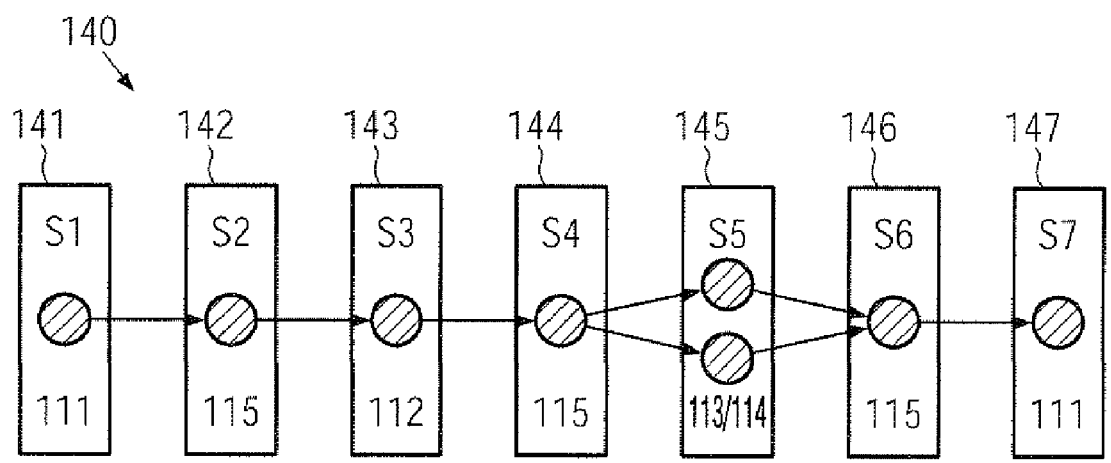

FIG. 1b schematically illustrates the material flow in the process tool 110 according to the above-specified example, in which a first process may be performed in the chamber 112 on the basis of a first process recipe and a second process may be performed in the chamber 113 or 114 on the basis of a second process recipe. Hence, the material flow 140 may comprise seven steps 141, 142, 143, 144, 145, 146, 147, each of which may be associated with at least one functional entity 111, 112, 113, 114, 115. For example, the first step 141 of the flow 140 may represent a substrate being located on the load port 111, in which one of the substrates 130 is prepared for being picked up by a transport system 115. Thus, a specific process time interval may be associated with step 141, depending on the configuration of the load port 111. The second step 142 may represent the movement of the transport system 115 for receiving a substrate and transporting the same to the process chamber 112. In the third step 143 the substrate may be processed in the chamber 112 on the basis of a specific process recipe. Thus, step 143 may depend on the configuration of the chamber 112 and the process recipe under consideration. It should be appreciated, however, that the step 143 may comprise respective "sub-steps," which may relate to substantially recipe-independent steps, such as receiving the substrate in the chamber while not actually processing substrate and preparing the substrate for being picked up by the transport system 115 after completion of the actual process. Thereafter, step 144 again relates to an activity of the tool-internal transport system 115 for picking up the substrate in the chamber 112 and transport the substrate to one of the chambers 113 and 114. Hence, the fifth step 145 may represent a "parallel" step, since both these chambers may be operated on the basis of the same process recipe. Next, the step 146 may again refer to a transport activity by the system 115 to pick up the substrate in one of the chambers 113, 114 and deliver the substrate to the load port 111. Hence, the final step 147 may represent a respective "activity" of the load port 111, for instance for receiving the substrate and preparing for the arrival of a further substrate.

During operation of the process tool 110, for a given cascade, i.e., a given number of substrates 130, the throughput of the tool 110 for this cascade is determined by the number of substrates contained therein and the time interval required for passing each of the substrates through the material flow 140. As previously explained, a corresponding cascade may be divided into different time periods so as to distinguish between process-specific or recipe-specific aspects and resource-specific aspects.

Figure 1C:
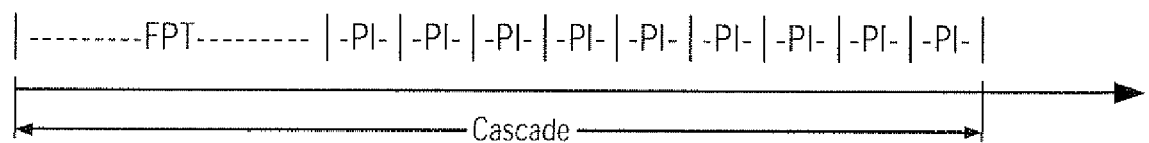

FIG. 1c schematically illustrates a time diagram for processing a cascade of ten substrates, wherein a time period FPT represents the first piece time, which corresponds to the total process time of the very first substrate, while the time periods indicated as "PI" correspond to the piece intervals of the substrates after completion of the last step 147, i.e., after arriving at the load port 111. Thus, the time interval for processing the cascade is defined by the first piece time FPT plus nine times the piece interval PI. Consequently, the throughput of the tool 110 is represented by 10 divided by the total processing time as specified before.

According to the principles disclosed herein, respective material flows, such as the flow 140, as well as the process time intervals associated with each step and sub-step of the material flow may be determined on the basis of tool messages in an automated manner by using statistical data processing to obtain robust and consistent values for the respective process times. It should be appreciated that a plurality of different material flows may be established within a specific process tool, which may depend on the current tool configuration and/or the overall process strategy for processing the substrates under consideration. For example, as previously explained, a plurality of different product types may be present in the manufacturing environment 150, wherein the various product types may differ with respect to process strategy. In this case, a certain type of substrate may not require all of the process steps as implemented in a specific process tool, such as the tool 110, thereby establishing a different material flow. For instance, it may be assumed that the process steps 143 and 144 may not be required for a certain type of product, so that a corresponding material flow has five steps, possibly in combination with respective sub-steps as previously explained. Similarly, upon a malfunction of one of the chambers 113, 114 or shutting-off of one of these chambers due to maintenance and the like, a different process flow may be established, since the parallelity of step 145 may no longer be present. Consequently, by monitoring and evaluating the respective tool messages, a current status of the process tool may be determined and may be used for defining a process flow as currently established in the tool, while, in other illustrative embodiments, a plurality of material flows may be identified, for instance, by maintaining historical data about any flows that may have been established in the tool under consideration over a certain time horizon as will be described later on in more detail. In addition, respective tool events may be extracted from the tool messages to determine the respective time intervals for the various steps 141, 142, 143, 144, 145, 146, 147, including respective sub-steps, such as pre-process time interval, which may represent a time in which the substrate is in the process chamber but is actually not in process, a post-process time, i.e., a time interval after actually processed substrate prior to being picked up by the transport system 115, as previously explained. It should be appreciated that respective process time intervals may be obtained on the basis of actually identified tool events, wherein a large number of respective events for a specified process time interval may be used, thereby obtaining high statistical relevance, which may provide enhanced robustness with respect to random fluctuations.

Figure 1D:
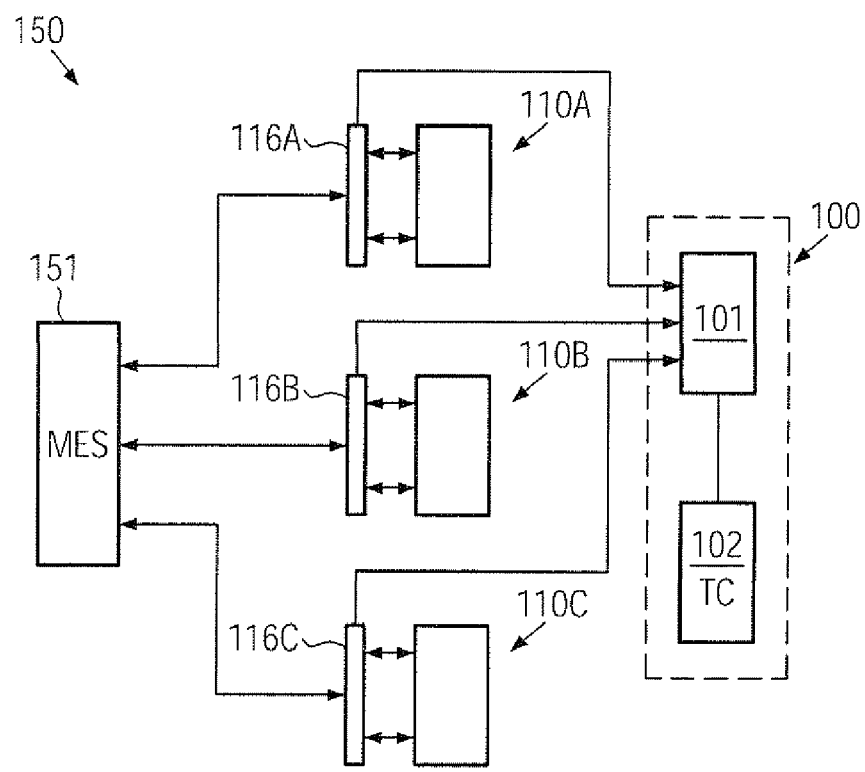
FIG. 1d schematically illustrates a manufacturing environment including a plurality of process tools that are operatively connected to an automatic throughput model generator, according to illustrative embodiments.

FIG. 1d schematically illustrates the manufacturing environment 150 according to one illustrative embodiment in which a plurality of process tools 110A, 110B, 110C may be provided, each of which may have a similar configuration as previously described with reference to the process tool 110. It should be appreciated, however, that, in a typical manufacturing environment for fabricating semiconductor devices, respective cluster tools may have a higher degree of complexity, as previously described with reference to the process tool 110. That is, typically, a greater number of functional entities may be provided, some of which may be operated on the basis of respective process recipes in order to establish a complex process sequence. Furthermore, in the embodiment shown in FIG. 1d, the manufacturing environment 150 may further comprise respective equipment interfaces 116A, 116B, 116C connected to the respective process tools 110A, 110B, 110C, which may be configured to exchange tool-specific information at a desired level of abstraction with a supervising control system 151, which may represent an MES, as is typically provided in a semiconductor facility. Furthermore, the manufacturing environment 150 may comprise an automatic throughput model generator 100, which may comprise a module 101 that is operatively connected to the one or more equipment interfaces 116A, 116B, 116C to receive tool messages therefrom at a level of abstraction that reflects tool events at entity level, as previously discussed. That is, contrary to the data communication of the equipment interfaces 116A, 116B, 116C with a supervising control system 151, which may be organized on the basis of state models, the module 101 may receive the tool messages so as to enable a recognition of tool events for each individual functional entity in the respective process tool 110A, 110B, 110C. Consequently, the presence of the respective functional entities, as well as their operational behavior, for instance in view of starting an activity and ending an activity, may be monitored by the module 101. In some illustrative embodiments, the module 101 may further be configured to store respective tool messages, at least for a certain time horizon or operating period, to enable a statistical processing of the tool messages with a desired degree of statistical significance.

Furthermore, the automatic throughput model generator 100 may comprise a throughput calculator 102 operatively connected to the module 101 and configured to determine one or more material flows in the tools 110A, 110B, 110C, in combination with associated process time intervals, as described above. That is, during operation of the throughput model generator 100, respective tool-specific information may be gathered over a specified operating time period, which may be stored and appropriately pre-processed in order to identify the functional entities of the process tools 110A, 110B, 110C. For example, during the specified operating time period, the respective tool messages may indicate activities of a specified number of functional entities, in combination with respective time intervals required for the respective entity activities. The generator 100 may also identify the parallelity of certain functional entities by referring to the process recipes of process chambers and/or by appropriately analyzing the tool messages, when, for a given cascade, only a portion of the substrates is processed in one process chamber while another portion is processed in a different process chamber for otherwise identical process steps. Moreover, the associated process time intervals may be determined on the basis of event logging within the module 101, which may allow identification of one or more "limiting" resources, i.e., functional entities which may actually determine the interval PI (FIG. 1c), since they may represent the entities having the lowest capacity for the current operational status of the process tool under consideration. Furthermore, the recipe-dependent process time intervals, and also the minimum static process time intervals, may be determined on the basis of the respective event logging capability of the module 101.

Figure 1E:
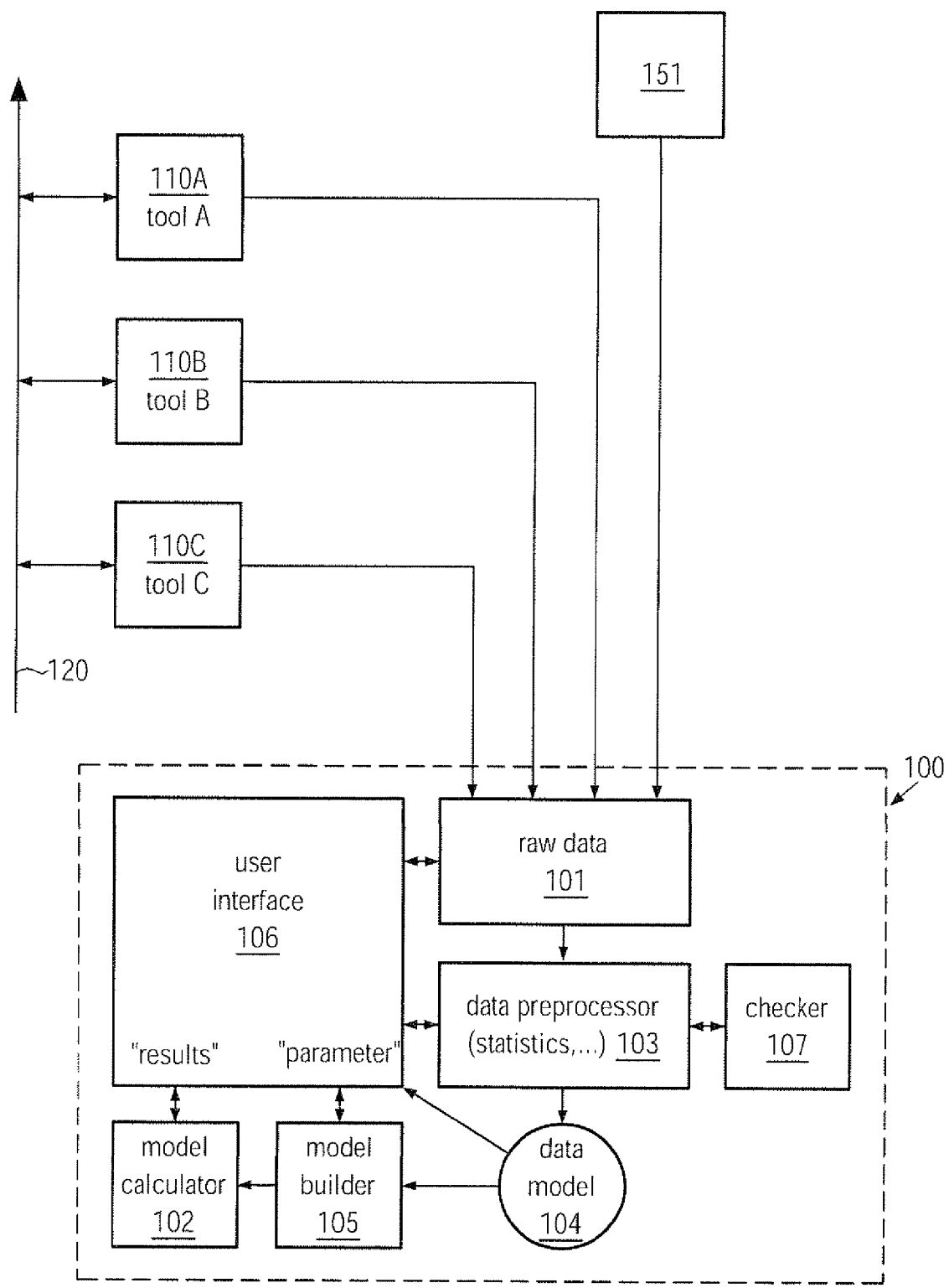
FIG. 1e schematically illustrates a manufacturing environment including an automatic throughput model generator, according to further illustrative embodiments.

FIG. 1e schematically illustrates the manufacturing environment 150 comprising the throughput model generator 100 according to still further illustrative embodiments. As illustrated, the environment 150 may comprise the plurality of process tools 110A, 110B, 110C, which may be operatively connected to the generator 100 so as to provide tool messages thereto. In the embodiment shown, the process tools 110A, 110B, 110C may have incorporated therein appropriate interfaces for data transfer to the generator 100 without requiring appropriately designed equipment interfaces, which may also provide data exchange with a supervising control system. Furthermore, the generator 100 may be configured to receive additional tool-specific or process-specific information from an external source, such as the MES 151 or any other appropriate information source. Thus, respective relevant information, such as recipes used in the process tools 110A, 10B, 110C and the like may be obtained from the external source 151, when the respective information may not be directly available from the process tools 110A, 110B, 110C. In the embodiment illustrated, the throughput model generator 100 may comprise the module 101 for receiving the tool messages in the form of non-processed data, which may be stored, in some illustrative embodiments, at least for a certain time horizon, if real time processing of the data may not be available. Furthermore, the generator 100 may comprise a data pre-processing module 103, which may have implemented therein appropriate algorithms for extracting relevant information from the tool messages, for instance, for identifying functional entities and also recognizing respective start points and end points of activities thereof. Furthermore, the module 103 may have implemented therein statistical analysis algorithms so as to operate on the process time intervals extracted from the tool messages in order to obtain representative process time intervals for the corresponding steps of a material flow identified by the tool messages.

For example, recipe-dependent process time intervals, as may be involved in steps 143 and 145 in FIG. 1b, may be obtained by determining an average of a plurality of respective process time intervals for each of these steps and using the corresponding average as a representative process time interval for the respective process step. Similarly, appropriate process time intervals may be determined for other entity activities not depending on process recipes, as will be described later on in more detail. The throughput module generator 100 may further comprise, in one illustrative embodiment, a data base 104 for maintaining a data model corresponding to the one or more process tools 110A, 110B, 110C. For example, the data base 104 may be operatively connected to the data pre-processor module 103 to store respective data base entries, which may relate to material flow and corresponding representative process time intervals determined by the module 103. Furthermore, a model building module 105 may be provided so as to be operatively connected to the data base 104 in order to retrieve therefrom an appropriate set of data as required for a specific process tool and a specified process scenario. That is, the model building module 105 may retrieve, for instance, upon request by a user interface 106, an appropriate set of data representing a material flow, in combination with the associated representative process time intervals. Thus, by creating the respective throughput model, the module 105 provides the appropriate platform for a respective process scenario of one or more of the tools 110A, 110B, 110C, for instance upon user request via the interface 106, on the basis of which the model calculator 102 may actually determine a throughput value, for instance on the basis of user-specified input parameters, such as length of the cascade and the like. Thus, respective throughput results may be provided via the user interface 106, wherein, in some illustrative embodiments, in addition to specified respective throughput-related parameters for the module 105 and the calculator 102, the user interface may also communicate with the data base 104 and/or the data pre-processing unit 103 and/or the module 101. For instance, raw data may be observed via the interface 106, wherein an appropriate pre-selection of raw data may be accomplished by interacting with the module 101 via the interface 106. Similarly, intermediate results, for instance, after pre-processing the raw data, may be viewed via the interface 106 upon interaction with module 103. Similarly, access to the data base 104 may be accomplished via the interface 106, wherein respective rights for accessing one or more of the modules of the generator 100 may be associated with a hierarchy level of users interacting with the interface 106. For instance, access to the data base 104, for instance for modifying data therein and/or interaction with the data pre-processor 103, for instance in view of modifying statistical analysis techniques and the like, may be restricted to privileged users only.

In one illustrative embodiment, a check unit 107 may be provided to verify the validity of the data created by the pre-processor 103 on the basis of tool messages obtained from the input section 101, as will be described later on in more detail.

During operation of throughput model generator 100 as shown in FIG. 1e, raw data may be supplied to the module 101, for instance, including baseline events from equipment interfaces or directly from a tool-internal control system and/or process-specific data and other equipment data, such as messages about entities configured in the MES, and the like may be used. In some illustrative embodiments, the module 101 may continuously receive respective data and appropriately store the raw data for further processing by the module 103. In other cases, respective raw data may be supplied over specified operating periods only, depending on the resources of the module 101. The data pre-processing module 103 may determine the data sets for the data model in the data base 104, for instance, on a regular basis or at any other appropriate point in time or, in some illustrative embodiments, on a substantially continuous basis, thereby generating respective entries for the data base 104. The entries of the data base 104 may further be configured to monitor the history of throughput-related data, which may be advantageous in view of recognizing material flow, as will be described later on, and also for estimating changes in throughput over time.

Figure 1F:
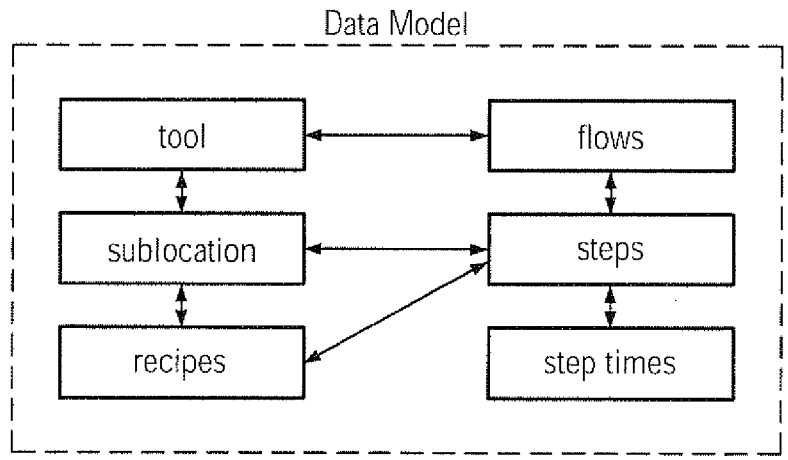
FIG. 1f schematically illustrates a data model including pre-processed throughput-related data as may be used by an automatic throughput model generator, according to illustrative embodiments.

FIG. 1f schematically illustrates a structure of the data model in the data base 104 (FIG. 1e) according to illustrative embodiments. The data model may represent one or more process "tools," which may be divided into respective "sublocations" or functional entities, at least some of which may be associated with respective process recipes. That is, as previously discussed, some of the functional entities, such as process chambers, may be operated on the basis of a dedicated process recipe, which, however, may vary depending on product type, results of research and development activities and the like. Hence, the data model may represent the "hardware" of the tool under consideration in the form of logical items "tool," "sublocation" and "recipes." Furthermore, the respective operational behavior, i.e., the "software," of the tools may be logically represented by a plurality of material flows that may be established on the basis of the functional entities in accordance with respective manufacturing flows for the products under consideration. The respective flows may be represented by the number and a respective order of steps, i.e., by activities performed by the respective functional entities. Thus, some of the steps may also be related to process recipes, as indicated by FIG. 1f. Additionally, the respective steps of each of the flows may be associated with corresponding process time intervals "step times," which may depend on recipes, depending on whether the respective steps associated with a functional entity are operated on the basis of a dedicated process recipe. Consequently, the structure of the data model representing the "hardware" and the software" of each process tool in the data base 104 is appropriately designed for constructing a throughput model on the basis of a desired operational scenario.

That is, if desired, the configuration of a process tool may be "modified" by selecting an appropriate process flow with the respective step times in combination with the associated recipes. For instance, as previously explained with reference to FIGS. 1a-1c, a process chamber may be "shut down" in the throughput model by selecting a respective material flow in which, for instance, one of two parallel process chambers may no longer be present. Thus, in combination with the process time intervals associated with this specific process flow, the throughput may then be calculated on the basis of a model that is constructed of the specific parameters reflecting the operational status under consideration. Similarly, if a change of a recipe may be evaluated with respect to changes in the throughput of a process tool under consideration for otherwise identical conditions, i.e., the same material flow is considered, appropriate process time intervals depending on the recipe may be retrieved from the data model 104. It should be appreciated that a respective logical structure may be maintained for different time periods, thereby enabling efficient monitoring of throughput overtime for a plurality of different process scenarios. Furthermore, respective material flows previously recognized by the data pre-processor module 103 may be maintained in the database 104 and may be used for flow recognition in a later stage, for instance by comparing a present recognized material flow with a plurality of previously determined material flows to identify equal material flows or recognize a similarity between previous material flow and a currently detected material flow.

Figure 1G:
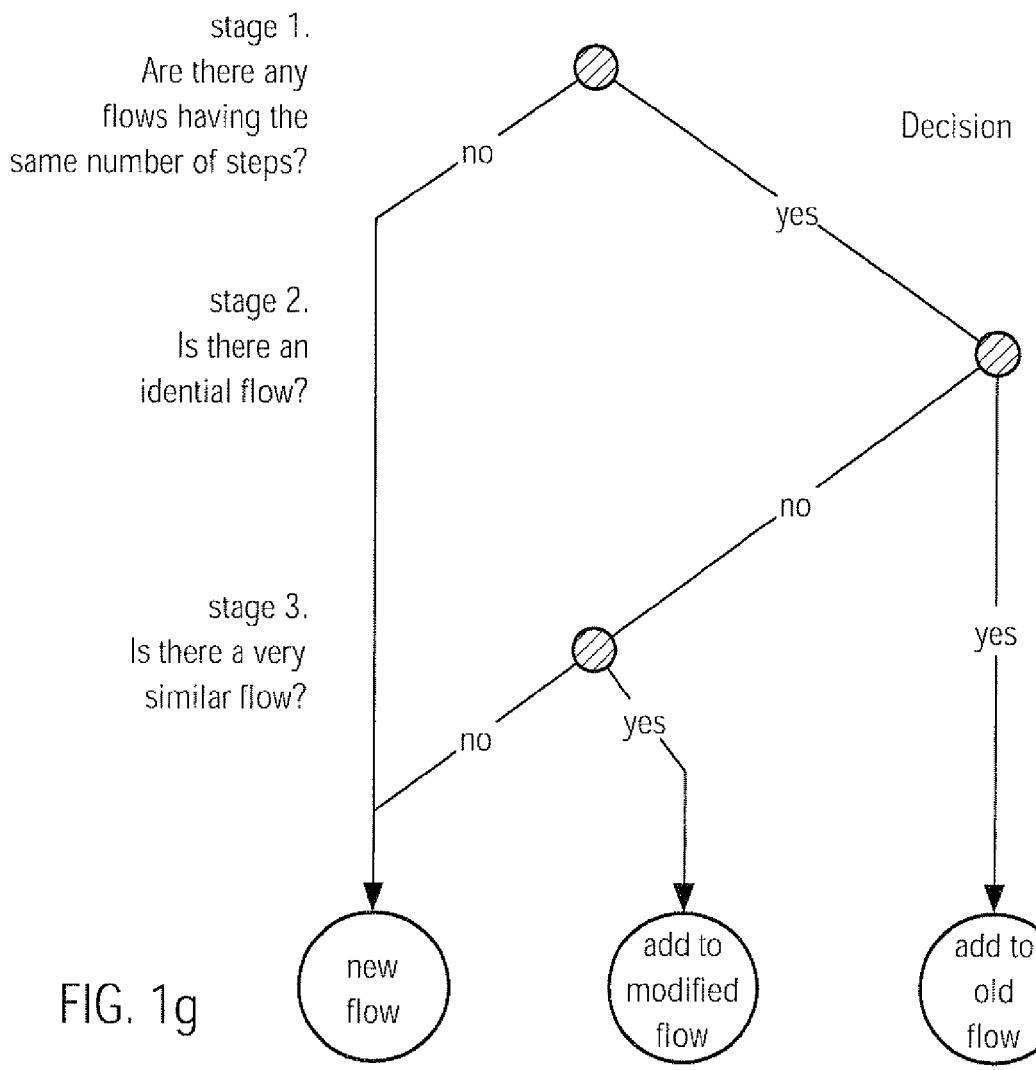
FIG. 1g schematically illustrates a decision tree as may be implemented in the automatic throughput model generator for identifying a material flow in the process tool, according to further illustrative embodiments.

FIG. 1g schematically illustrates a decision tree that may be implemented in the pre-processing unit 103 for efficiently identifying material flows on the basis of the tool messages obtained by the module 101. That is, for defining the basic process steps in a material flow, a plurality of decisions may have to be automatically made to obtain the process steps, for which statistical samples for the associated time intervals have to be obtained from the module 101. The decision tree shown in FIG. 1g is an abstract example for implementing recognition of a material flow on the basis of an automated procedure. As shown in stage 1 of the decision tree, the number of steps may be determined on the basis of the tool messages, i.e., the various activities of the respective functional entities may be determined for completely processing a substrate in the process tool. For example, the module 103 may access the data model 104 in order to determine whether or not a material flow having the same number of steps as determined in a previous time period may have been stored. If a material flow of the same number of steps is not stored in the data model 104, then the model 104 decides that a new material flow has been recognized and the corresponding sequence of process steps recognized in the tool messages may be added as a new material flow to the data model 104. If a material flow having the same number of steps is identified in stage 1, the decision finding algorithm advances to stage 2, in which it is decided whether or not an identical flow has previously been stored in the data model 104. For example, it may be determined whether or not the same functional entities are involved in the previous material flow and the current detected material flow. Furthermore, the order of the process steps may be compared to the order of process steps of the material flow contained in the data model. If in stage 2 the currently detected material flow is assessed to be identical with a previously stored material flow, respective process time intervals may be added to the previously stored material flow, however, with updated time marks, if desired. If in stage 2 it is decided that a currently detected material flow is different, then the decision finding algorithm may advance to stage 3, in which it may be decided whether or not the current material flow is "very similar" to the previously stored material flow. If in stage 3 it is decided that the material flows are not very similar, it may be decided that a new flow has been recognized. If in stage 3 the currently detected material flow is assessed to be very similar to a previous material flow, a modified flow of the previously stored material flow may be established and may be indicated as a modified version. For instance, a very similar flow may be represented by a material flow in which the parallelism of one or more steps may be reduced or increased due to shutting off of a functional entity or adding an additional functional entity. It should be appreciated that additional or other stages may be implemented into the decision tree of FIG. 1g, depending on the desired degree of "granularity" in distinguishing material flows in a specific process tool.

After recognizing the material flow, the context of this flow may be used for obtaining statistical samples of various required time intervals related to the functional entities associated with the recognized material flow. That is, the tool messages may be searched for tool events relating to the same material flow steps in order to obtain relevant time interval values.

According to illustrative embodiments, respective process time intervals may be distinguished so as to obtain two types of time intervals, such as static time intervals and recipe-related time intervals. Static time intervals, such as wafer exchange times, post-process time intervals, i.e., the actual process is finished but substrate is still in the process chamber, pre-process time intervals, i.e., the process has not yet started but the substrate is in the process chamber, are associated with one functional entity of the process tool. Hence, the time interval necessary for completing these steps does not depend on the selected recipe. In contrast, recipe-dependent process time intervals additionally vary according to the selected process recipe. The length of static time intervals and recipe-dependent time intervals is defined by the period between two predefined log events that are conveyed by the tool messages and may be extracted therefrom by parsing the data packets or any other information structure or format used for transmitting the tool messages. For example, the messages may be transferred on the basis of standard protocols, as previously described.

Figure 1H:
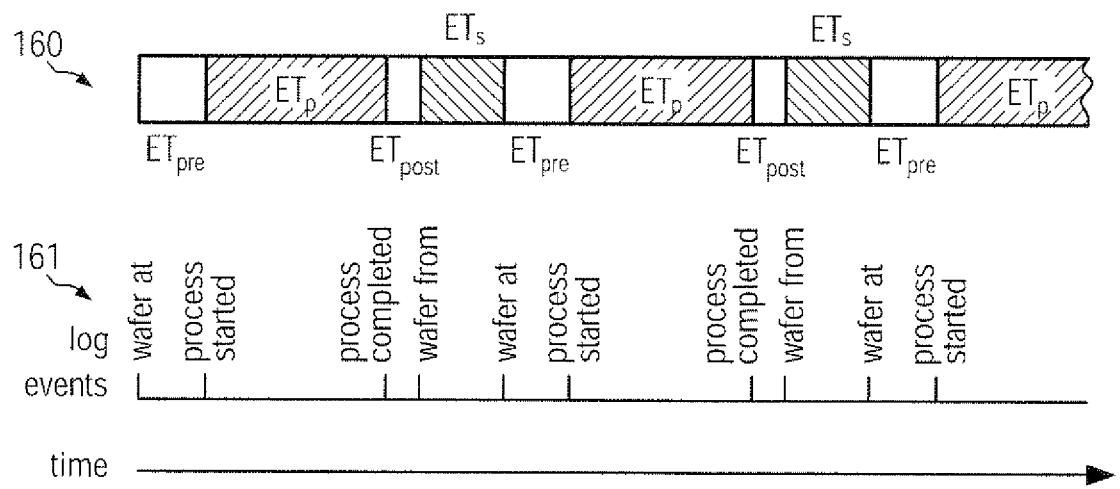
FIG. 1h schematically illustrates a time diagram of tool messages and respective tool events used for determining process time intervals, according to illustrative embodiments.

FIG. 1h schematically illustrates a time diagram for the processing of substrates in a functional entity, such as a process chamber on the basis of a specified process recipe, wherein a respective recipe-dependent process time interval is indicated as $ET_p$ (Entity Time process). Furthermore, respective pre-process and post-process time intervals are indicated as $ET_{pre}$ and $ET_{post}$, respectively, and represent time intervals in which the substrate is in the respective functional entity or process chamber without being actually processed. Furthermore, a time interval for exchanging the substrate in the process chamber under consideration is indicated as $ET_s$ (Entity Time swap). Thus, as shown, a sequence of activities 160 may start with the pre-process time $ET_{pre}$ followed by the actual processing of a substrate $ET_p$. After completion of the actual process, the substrate may still be maintained in the chamber, as indicated by the interval $ET_{post}$, after which the substrate may be removed and a further substrate may be placed into the chamber, wherein respective substrate handling activities may be specified by time interval $ET_s$. Thereafter, a further sequence of pre-process time $ET_{pre}$, actual process time $ET_p$ and post-process time $ET_{post}$ may follow in the chamber under consideration.

The portion of the diagram indicated as 161 may represent a sequence of log events correlated to the sequence 160. Thus, at the beginning of the pre-process time, a "wafer at" event is generated and may be conveyed via a tool message. Upon actually processing the substrate, a "process started" event may be generated and a "process completed" event may be associated with the end of $ET_p$. Upon removing the substrate from the process chamber under consideration, a "wafer from" event may be generated, and after the arrival of a further substrate in the process chamber under consideration, a further "wafer at" event may be created. Consequently, based on the respective log events 161, the $ET_p$ time intervals may be determined for the material flow under consideration and the corresponding process recipe by extracting the events from the tool messages. It should be appreciated that, depending on the process and the recipe, the times $ET_p$ may vary, for instance, due to different end points detected by a respective mechanism and the like. In other cases, typical random fluctuations may occur for otherwise identical process conditions, thereby also contributing to a varying recipe-dependant process time $ET_p$. Thus, on the basis of a plurality of these recipe-dependent time intervals, a respective representative recipe-dependent time interval may be determined, for instance, by calculating a respective average value. The corresponding representative process time interval may be determined for each of the recipe-dependent process steps of the material flow under consideration, thereby obtaining a representative overall total process time of a substrate with respect to the material flow under consideration. It should be appreciated that a representative recipe-dependent process time interval may be obtained on the basis of any statistical technique, for example, by eliminating any out-liners, by fitting an appropriate curve and the like, depending on the computational resources of the data pre-processor 103 (FIG. 1e).

Figure 1I:
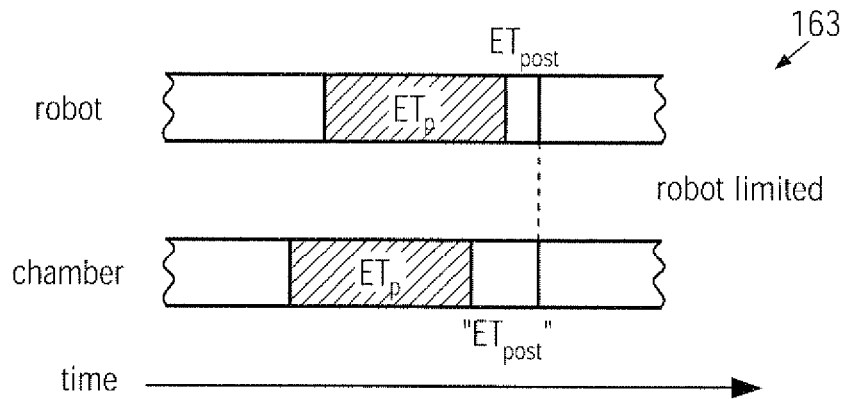
FIGS. 1i-1j schematically illustrate time diagrams of interrelated functional entities in a process tool.
Figure 1J:
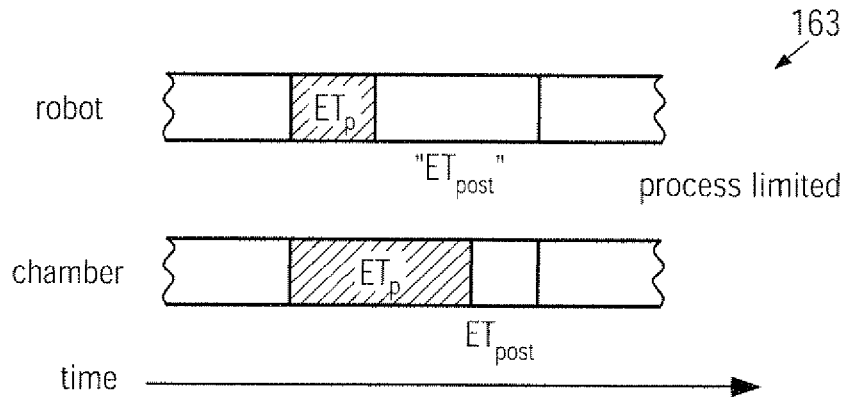
Figure 1K:
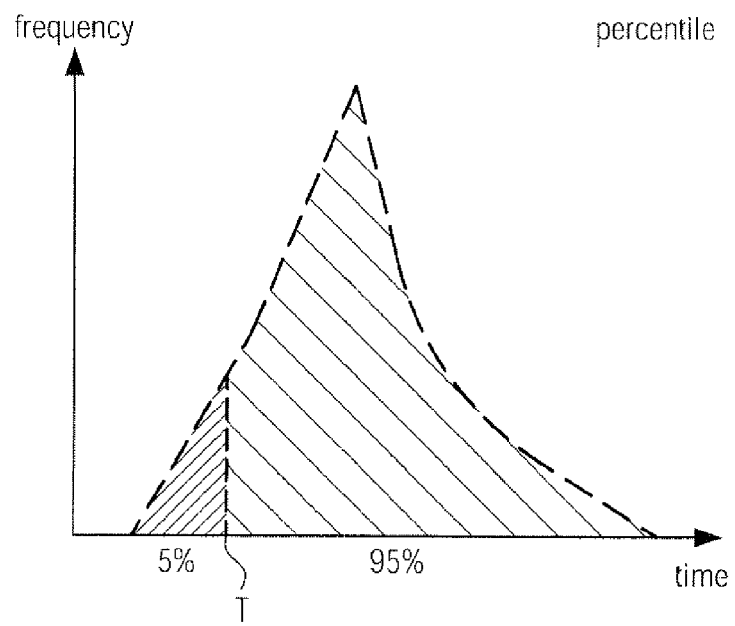
FIG. 1k schematically illustrates a diagram representing the frequency of process time intervals for a specified functional entity to obtain a statistically significant representative process time interval for the functional entity under consideration, according to illustrative embodiments.

With reference to FIGS. 1i-1k, the determination of process time intervals that are not dependent on a recipe may be described in more detail, according to illustrative embodiments. For the calculation of static time intervals, the functional status of an entity is taken into consideration by "viewing" events for substrates being processed in the respective entity. However, a complex mutual dependence may exist between the various functional entities, which may have an influence on a corresponding process time interval.

FIG. 1i schematically illustrates a time diagram 163, in which the activities of a first functional entity, such as a robot handling system, and a second functional entity, such as a process chamber, are illustrated. In the example shown, the robot handling system has an "actual" process time $ET_p$ and a post-process time $ET_{post}$, which may represent the real minimum operating time of the robot handling system. As indicated, this combined time interval may be longer than an actual process time of the process chamber, thereby requiring an additional waiting time of the process chamber after completion of the actual process in the process chamber, creating a "false" post process time "$ET_{post}$" for the process chamber.

FIG. 1*j* schematically illustrates a situation in which the overall performance of the robot handling system and the chamber served by the robot handling system may be restricted by the process performed in the process chamber. Hence, the actual process time $ET_p$ of the chamber and the required post-process time $ET_{post}$ may be significantly longer compared to the actual process time $ET_p$ of the robot handling system, thereby creating a false process time $ET_{post}$ for the robot handling system. Consequently, extracting the respective post-process times according to the situations as described in FIGS. 1*i* and 1*j* on the basis of tool messages conveying an event logging sequence as, for instance, illustrated in the sequence 161 may result in an over-estimated required post-process time, which may result in significantly different throughput values, when calculating the throughput on the basis of, for instance, a modified process recipe, while using a substantially non-modified material flow.

FIG. 1*k* schematically illustrates the determination of appropriate static process time intervals while substantially avoiding a negative influence of mutual dependencies, as described with reference to FIGS. 1*i* and 1*j*. FIG. 1*k* schematically illustrates the distribution of process time intervals for a specific functional entity for performing its dedicated activity that is not dependent on a process recipe, such as a robot handling system and the like. In order to obtain a high degree of robustness of the throughput model to be established, a reasonable minimum process interval, that is, a time interval that actually describes the "real" mechanical capability of the entity under consideration, may be determined on the basis of a moderately large number of time intervals actually determined by parsing many log events, such as events shown in FIG. 1*h*. In one illustrative embodiment, this may be accomplished on the basis of percentiles, which is to be understood as a mathematical algorithm for determining a threshold below or above which a specified percentage of events of a distribution may be located. For instance, in the illustrative example shown, a five-percentile may be used, which may represent the time interval value T below which 5% of the distribution may be located, while the remaining 95% of the detected process time intervals may have a value greater than the threshold T. It should be appreciated, however, that any other percentile may be used, if desired. Furthermore, other statistical rules may be used for determining an appropriate "minimum" process time interval that may be used as a representative process time interval for the recipe-independent functional entity under consideration.

As a consequence, the module 103 (FIG. 1*c*) may automatically determine respective process time intervals, for recipe-dependent entities and/or recipe-independent entities, and may enter the corresponding representative time intervals in combination with a corresponding material flow into the data model 104 (FIG. 1*e*) to determine the current "hardware" and "software" status of the tools under consideration on the basis of solid experimental data.

It should be appreciated that the tool events extracted from the tool messages, for instance in the form of log events as shown in FIG. 1*h*, may represent an efficient means for determining material flows and the time intervals. In some illustrative embodiments, an increased degree of robustness and accuracy may be accomplished by verifying the validity of the temporal succession of respective tool events in order to be able to disregard non-verified tool events. That is, the sequence of log events 161 (FIG. 1*h*) may be verified with respect to their authenticity so as to substantially exclude erroneously identified sequences. Thus, according to illustrative embodiments, a check unit may be provided, for instance in the form of the unit 107 as shown in FIG. 1*e*. In one illustrative embodiment, the check unit 107 for verifying the validity of the temporal succession of log events may be implemented in the form of a state machine, which may be a freely configurable state machine for defining allowed event transitions. Thus, the temporal sequence of log events may be verified by applying the sequence to the state machine so as to verify whether or not a valid succession of log events has been extracted, thereby also indicating whether or not the respective time intervals may be valid candidates for determining respective process time intervals.

Figure 1L:
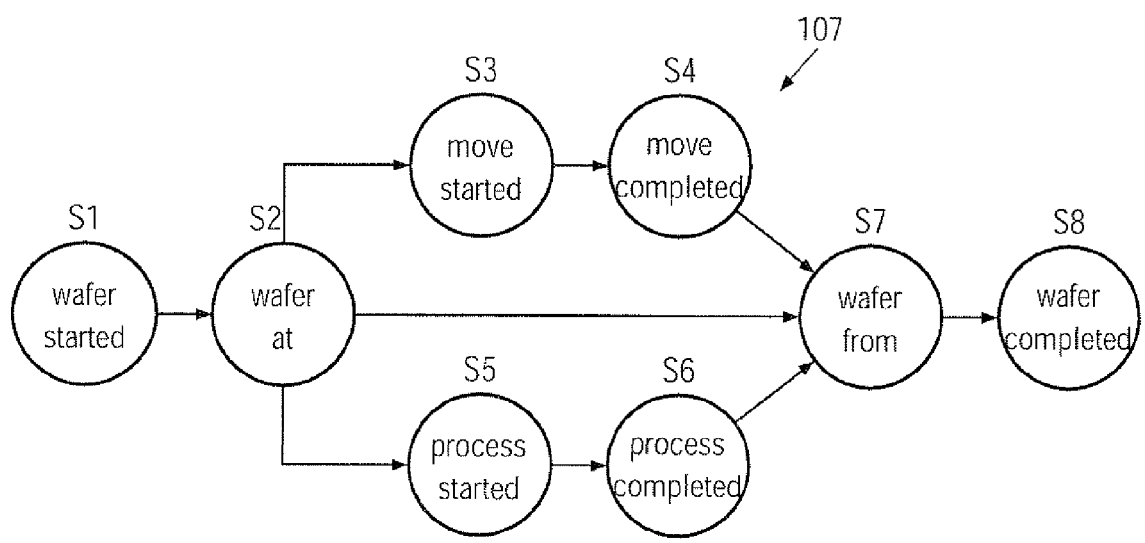
FIG. 1l schematically illustrates a state machine for verifying the validity of a succession of tool events, according to further illustrative embodiments.

FIG. 1*l* schematically illustrates an example of the state machine 107 representing a temporal sequence of log events. For instance, a state S1 represents a "wafer started" event, which is to be followed by a state S2 "wafer at" event. According to the state machine shown, the state S2 may be followed by a sequence of states S3 and S4 corresponding to "move started" and "move completed," that is, the arrival of a substrate accompanied by the start and the end of a transport activity. Similarly, a sequence of states S5 and S6 may follow the state S2, which may represent "process started" and "process completed," that is, after the state S2 corresponding to the arrival of the substrate at a certain functional entity, a "process started" must be followed by a "process completed." Similarly, after the state S2 and the corresponding possible branching into sequences S3, S4 or S5, S6, a state S7 "wafer from" is to be followed by the state S8 "wafer completed." Consequently, upon verifying the sequences extracted from the log events 161 (FIG. 1*h*), a verification of the temporal succession and thus of the validity of the respective process time intervals may be accomplished. Thus, the overall accuracy of the respective throughput model may be enhanced.

As previously discussed, the data model in the data base 104 (FIG. 1*e*) may contain entries corresponding to a logical structure as previously explained with reference to FIG. 1*f*. Additionally, in some illustrative embodiments, a history of throughput-related data may be established on the basis of respective data base entries, for instance in order to detect long-term changes in throughput or to enable the determination of throughput results on the basis of different operating periods for any desired process scenario.

Figure 1M:
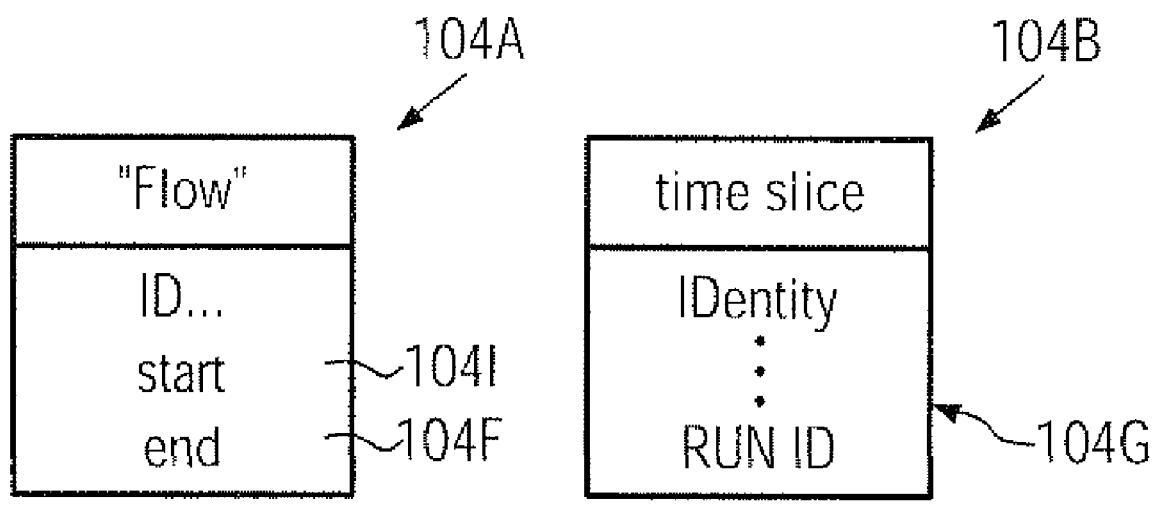
FIG. 1m schematically illustrates data items that may be used in the data model to establish a history of throughput-related information, according to still further illustrative embodiments.

FIG. 1*m* schematically illustrates respective data base entries or items, which may include appropriate time markers so as to allow the indication of the temporal context of the respective entries. For example, a "static" data base item 104A may include a time mark 1041 indicating the point in time of first appearance of the item 104A and may include a second time mark 104F indicating the point in time of last appearance of the item 104A. For instance, the item 104A may represent a "material flow," which may appear only once in the data model 104. Thus, by adding the marks 1041, 104F, the history of respective items 104A may be monitored. Additionally, the data model may comprise items 104B that may include stored time intervals, and which may be created for each new run of the throughput model generator 100 (FIG. 1*e*). Thus, by adding a "RUN ID" 104G, which may also refer to a temporal context of the run under consideration, a history of respective calculated process time intervals may be obtained, which may be advantageous for performing successive throughput calculations, which may therefore be based on exact times determined for every run of the throughput model generator 100.

As a result, the present disclosure provides systems and methods for estimating the throughput of cluster tools of a manufacturing environment on the basis of automatically generated throughput models. For this purpose, tool-specific messages may be collected and analyzed so as to identify material flows and respective process time intervals with high statistical relevance. Consequently, throughput-related information may be created for a plurality of process scenarios with a high degree of robustness against random fluctuations and with a high degree of consistency.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for automatically determining a throughput of a process tool, the method comprising:
    identifying functional entities of said process tool by monitoring tool messages created by said process tool during operation, wherein the tool messages indicate activities of a number of functional entities;
    identifying one or more material flows as a sequence of process steps performed by at least some of said functional entities, wherein identifying said one or more material flows comprises determining whether the number of functional entities of a first material flow is the same as a previously determined number of functional entities of a second material flow;
    determining a process time interval for each of said process steps of said one or more material flows; and
    determining a throughput of said process tool for a selected process scenario for said one or more material flows by using said determined process time intervals.

2. The method of claim 1, wherein determining a process time interval for each of said process steps comprises identifying first functional entities that are not dependent on a dedicated process recipe and identifying second functional entities that are dependent on a dedicated process recipe, wherein said first and second functional entities are identified by using at least said tool messages.

3. The method of claim 2, wherein determining a process time interval for each of said process steps comprises statistically evaluating a plurality of process time intervals corresponding to a specific one of said process steps so as to obtain a representative process time interval for said specific process step.

4. The method of claim 1, further comprising storing data representing said one or more material flows and process time intervals in a data base.

5. The method of claim 4, further comprising updating said data base on a regular basis while maintaining at least some of said data previously entered into said data base so as to maintain a history of said one or more process flows and said process time intervals.

6. The method of claim 5, wherein said one or more material flows are determined by comparing a material flow obtained by using said tool messages with a history of said one or more materials flows represented in said data base.

7. The method of claim 1, wherein monitoring said tool messages comprises monitoring tool messages that indicate respective time intervals for performing the activities.

8. The method of claim 1, comprising identifying the first material flow as a new material flow if the number of functional entities of the first material flow is different than the previously determined number of functional entities of the second material flow.

9. The method of claim 8, comprising determining whether the first material flow and the second material flow include the same functional entities in response to determining that the number of functional entities of the first material flow is the same as the previously determined number of functional entities of the second material flow.

10. The method of claim 9, comprising identifying the first material flow as identical to the second material flow when the first and second material flows include the same functional entities and the same order of process steps.

11. The method of claim 10, comprising modifying time intervals associated with the second material flow using time intervals associated with the first material flow in response to identifying the first material flow as identical to the second material flow.

12. The method of claim 9, comprising determining a degree of similarity between the first material flow and the second material flow if the first and second material flows are not identified as identical.

13. The method of claim 12, comprising modifying the second material flow based on the first material flow when the first and second material flows have a high degree of similarity.

14. The method of claim 1, wherein identifying the sequence of process steps in said one or more material flows comprises identifying the sequence of process steps in said one or more material flows based upon the monitored tool messages.

15. The method of claim 14, wherein identifying the sequence of process steps in said one or more material flows comprises identifying the sequence of process steps concurrently performed by said at least some of the plurality of functional entities on a plurality of substrates.

16. A method for automatically determining a throughput of a process tool, the method comprising:
    identifying functional entities of said process tool by monitoring tool messages created by said process tool during operation;
    identifying one or more material flows as a sequence of process steps performed by at least some of said functional entities;
    determining a process time interval for each of said process steps of said one or more material flows, wherein determining the process time interval for each of said process steps comprises identifying first functional entities that are not dependent on a dedicated process recipe and identifying second functional entities that are dependent on a dedicated process recipe, wherein said first and second functional entities are identified by using at least said tool messages, and wherein determining the process time interval for each of said process steps comprises statistically evaluating a plurality of process time intervals corresponding to a specific one of said process steps so as to obtain a representative process time interval for said specific process step, and wherein obtaining said representative process time interval for said specific process step comprises obtaining a distribution of said plurality of process times and selecting a threshold in said distribution as said representative process time interval.

17. The method of claim 16, wherein said threshold is selected on the basis of a specified percentile of said distribution.

18. A method for automatically determining a throughput of a process tool, the method comprising:

identifying functional entities of said process tool by monitoring tool messages created by said process tool during operation;

identifying one or more material flows as a sequence of process steps performed by at least some of said functional entities;

determining a process time interval for each of said process steps of said one or more material flows;

determining a throughput of said process tool for a selected process scenario for said one or more material flows by using said determined process time intervals; and verifying validity of a temporal succession of said tool messages and using tool messages having a successfully verified validity for determining said process time intervals.

19. The method of claim 18, wherein said validity of the temporal succession is verified by using a state machine representing all tool events of said process tool.

* * * * *